ized Patent [19]

Miller

Patent Number: 4,770,107
Date of Patent: Sep. 13, 1988

[54] PORTABLE TRAVEL TRAY

[76] Inventor: Deborah S. Miller, 53 Melden Dr., Brunswick, Me. 04011

[21] Appl. No.: 15,434

[22] Filed: Feb. 17, 1987

[51] Int. Cl.⁴ .............................................. A47B 37/00
[52] U.S. Cl. ......................................... 108/44; 5/118; 108/42; 108/135; 297/135
[58] Field of Search ...................... 108/135, 42, 44, 45, 108/46, 49; 5/94, 118

[56] References Cited

U.S. PATENT DOCUMENTS

| 1,277,781 | 9/1918 | Trammell | 5/94 |
| 1,928,731 | 10/1933 | Mattson | 108/44 |
| 2,766,087 | 10/1956 | Marcus | 108/135 X |
| 3,034,153 | 5/1962 | Sargent | 108/27 X |
| 3,067,975 | 12/1962 | Wilcox | 108/135 X |
| 3,199,467 | 8/1965 | Compton | 108/27 X |
| 3,346,125 | 10/1967 | Miller et al. | 108/49 X |
| 3,799,071 | 3/1974 | Gerlach | 108/46 |

FOREIGN PATENT DOCUMENTS

| 15273 | of 1909 | United Kingdom | 108/44 |
| 838322 | 6/1960 | United Kingdom | 108/44 |
| 1101744 | 1/1968 | United Kingdom | 108/46 |

Primary Examiner—Peter A. Aschenbrenner
Attorney, Agent, or Firm—Edward A. Gordon

[57] ABSTRACT

A portable and collapsible travel tray assembly is provided for mounting in conjunction with a conventional automobile seat positioned to the front of the user of the tray and the seat of the user, particularly a child's car seat. The portable tray assembly comprises a rigid bottom panel member having front, back, and side portions. The bottom panel member is provided with a pair of opposing folding side panels which extend along the side portions of the bottom panel and above the plane of the bottom panel when in the unfolded position. The tray assembly also includes a front folding panel extending between the opposing side panels and along the front portion of the bottom panel and above the plane of said bottom panel. The folding side and front panels permit the tray to be converted from a stowed or collapsed position when the side and front panels are in the folded or stowed position to a position of use when in the unfolded position. The opposing side panels include flexible arm members which extend beyond the front portion of the bottom panel and attach to front suspension means for supporting the front portion of the tray. A back suspension means is attached to the back portion of the bottom panel whereby the front and back suspension means coact to hold the tray in level position. When so mounted the tray is particularly adapted to serve as a small travel tray for the reception of articles in a position where it is readily accessible to a child, for example, seated in a car seat.

15 Claims, 4 Drawing Sheets

PORTABLE TRAVEL TRAY

FIELD OF THE INVENTION

The present invention relates generally to travel trays for use in automobiles and more particularly to a collapsible travel tray assembly that may be readily employed in an automobile in conjunction with a child's car seat.

BACKGROUND OF THE INVENTION

On automobile trips, whether short or long, it often happens that a baby or young child is a passenger. Numerous devices have been proposed for restraining a baby or young child on the seat of a chair. Examples of such devices can be found in U.S. Pat. Nos. 2,404,108, 2,652,183 and 4,235,474. When a baby or young child is to be transported in an automobile such prior art restraining devices generally comprise a child's "car" seat which is attachable to the seat of an automobile by straps, hangers or the like. Such car seats are also provided with straps or harnesses to secure the infant or child's body in the car chair so that the child cannot topple sideways or forwardly while at the same time leaving the child's legs and arms free for movement. Also numerous prior art devices have been proposed for providing various trays for automobiles. Examples of such devices are disclosed in U.S. Pat. Nos. 2,483,043; 2,601,177; 2,798,780; and 2,932.544.

Still other prior art devices have disclosed high chairs for young children which provide both a seat and a tray structure as shown in U.S. Pat. No. 1,283,225. Additionally in U.S. Pat. No. 2,504,897 there is disclosed a tray mounting for counter and chair use.

While such prior art devices have provided improvement in the areas intended, there still exists a great need to provide a portable, collapsible travel tray assembly structure which will coact with the front seat of an automobile and a child's car seat secured to the rear seat of an automobile, to provide a removable temporary supporting surface for holding food, toys and the like.

Accordingly a principal desired object of the present invention is to provide a portable travel tray assembly structure which will coact with the front seat of an automobile and a child's car seat secured to the back seat of the automobile to provide a removable temporary tray for holding various articles.

A further desirable object of the present invention is to provide a novel collapsible automobile tray assembly structure that is readily adjustable on its suspension structure.

A still further desirable object of the present invention is to provide a collapsible travel tray with a mounting assembly which can be easily adapted for use with any automobile and child's car seat without requiring any changes in construction.

A still further desirable object of the present invention is to provide a travel tray which can be quickly and easily detached from the child's car seat when not in use or when it is desired to remove the child's car seat.

A further desirable object of the present invention is to provide a travel tray of the above described object which is simple and economical to construct and easy to handle as well as to attach and detach.

A still further desirable object of the present invention is to provide a travel tray of the above described objects which minimizes injury in the event of an automobile accident.

Other desirable objects and advantages of the present invention will in part appear hereinafter and will in part become apparent after consideration of the specification with reference to the accompanying drawings.

SUMMARY OF THE INVENTION

In accordance with the present invention a portable and collapsible travel tray assembly is provided for mounting in conjunction with a conventional automobile seat positioned to the front of the user of the tray and the seat of the user, particularly a child's car seat. The portable tray assembly comprises a substantially rigid bottom panel member having front, back, and side portions. The bottom panel member is provided with a pair of opposing folding side panels which extend along the side portions of the bottom panel and above the plane of the bottom panel when in the unfolded position. The tray assembly also includes a front folding panel extending between the opposing side panels and along the front portion of the bottom panel and above the plane of the bottom panel when in the unfolded position. The folding side and front panels permit the tray to be converted from a stowed or collapsed position when the side and front panels are in the folded position to a position of use when in the unfolded position. The opposing side panels include flexible arm members which extend beyond the front portion of the bottom panel and attach to front suspension means for supporting the front portion of the tray. A back suspension means is attached to the back portion of the bottom panel whereby the front and back suspension means coact to hold the tray in level position.

BRIEF DESCRIPTION OF THE DRAWINGS

For a fuller understanding of the nature and desired objects of the invention, reference should be had to the following detailed description taken in connection with the accompanying drawings wherein like reference characters denote corresponding parts throughout the several views and wherein.

DETAILED DESCRIPTION OF PREFERRED EMBODIMENTS

Figure 1:
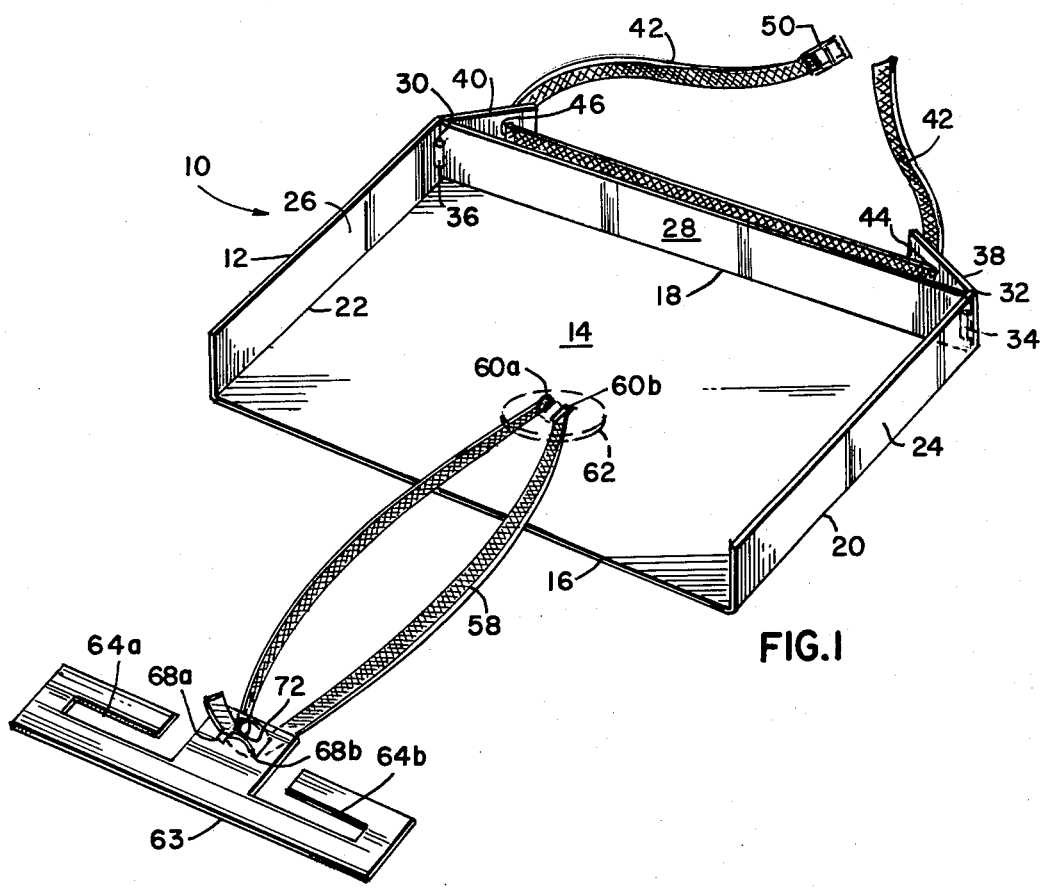
FIG. 1 is a perspective view of an embodiment of the portable travel tray assembly in accordance with the present invention.
Figure 2:
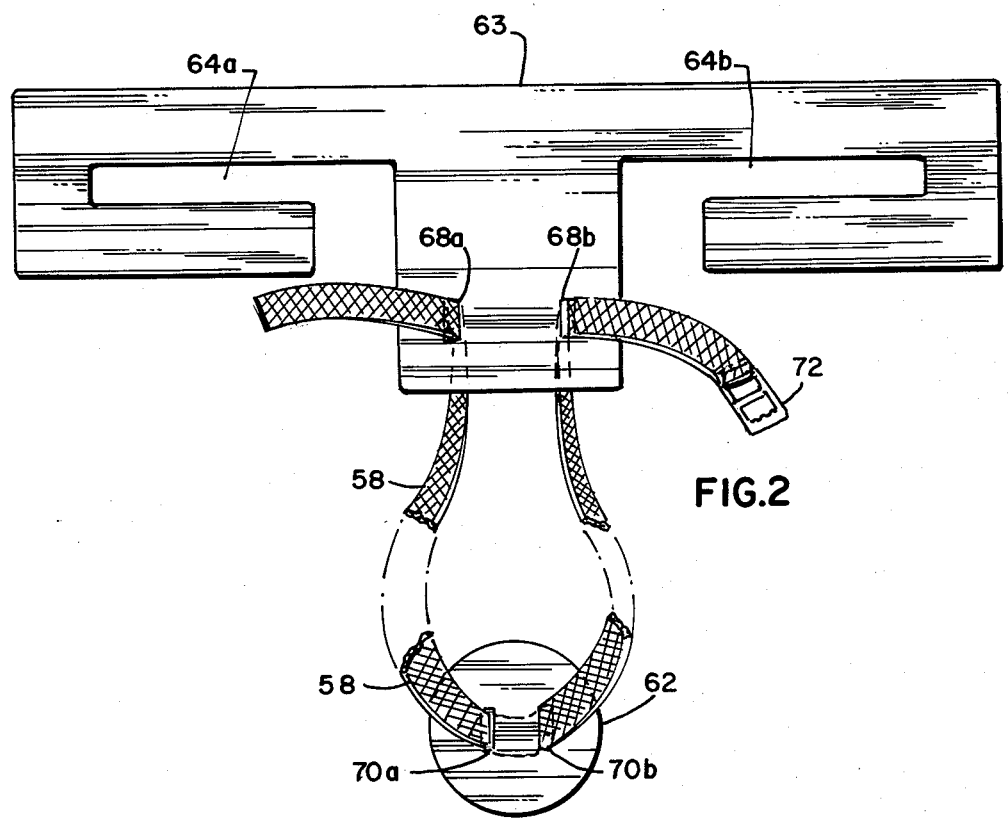
FIG. 2 is an enlarged perspective view of the rear suspension components of the travel tray assembly illustrated in FIG. 1.
Figure 3:
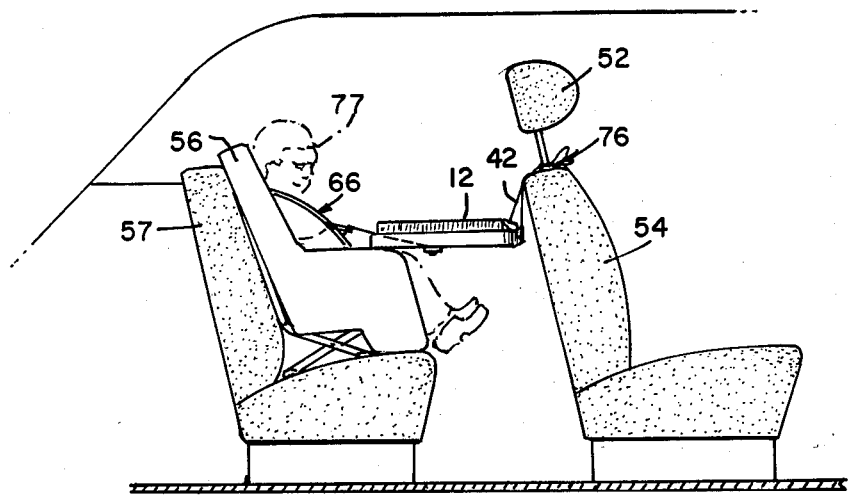
FIG. 3 is a perspective view of the portable tray assembly of FIG. 1 mounted between the front seat of an automobile and a child's car seat positioned on the back seat of the automobile.
Figure 4:
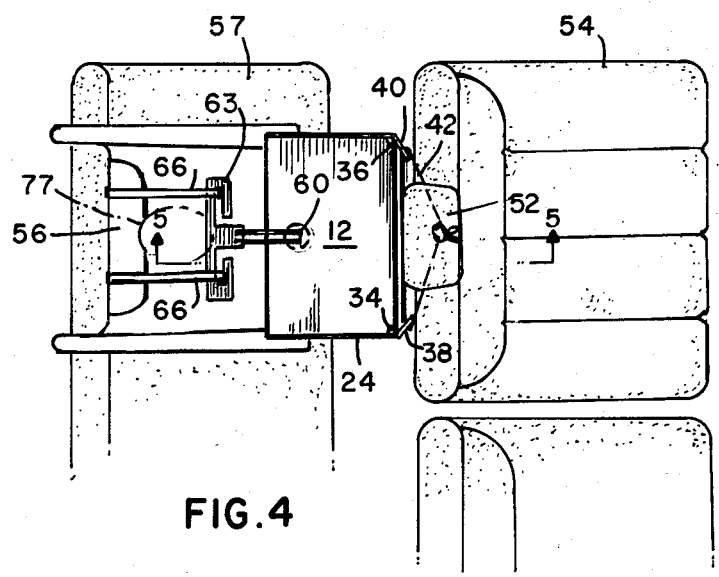
FIG. 4 is a top perspective view of the portable tray assembly of FIG. 3 and including a child in the car seat.
Figure 5:
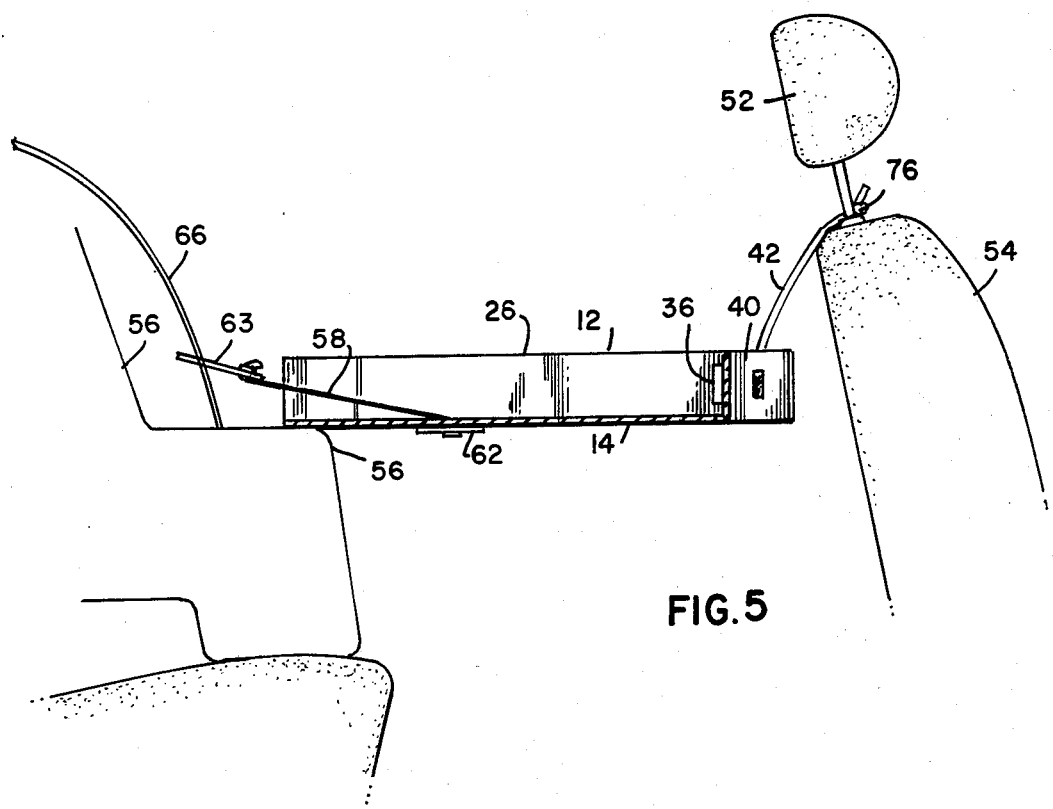
FIG. 5 is a cross section view along the line 5—5 of FIG. 4.

Referring now to drawings and particularly FIGS. 1-3, there is illustrated generally at 10 a portable and collapsible travel tray assembly in accordance with the present invention which is particularly suitable for use in an automobile between the back of the front seat and a child's car seat secured to the rear or back seat of the automobile. The travel tray assembly 10 comprises a tray 12 which is of substantially rectangular form having a bottom panel 14, which has a back portion 16, a front portion 18 and side portions 20 and 22. The bottom panel 14 is provided with a pair of opposing folding side panels 24 and 26 which extend along the side portions 20 and 22 respectively of the bottom panel 14. The tray 12 also includes a front folding panel 28 which extends along the front portion 18 of the bottom panel. The front panel 28 is of sufficient length whereby the ends 30 and 32 of the panel are in abutting relationship with side panels 24 and 26 when all panels are in the unfolded upright position. As used in the specification and claims, the term folded shall mean the position of the front and said panels when folded against the bottom panel or when folded outwardly so as to be in the same plane as the bottom panel. Similarly the term unfolded shall mean the position of the front and side panel members when in the upright position for use. In one preferred embodiment, flange members 34 and 36 are provided on the inner wall of side panels 24 and 26 and serve to prevent front panel 28 from moving or traveling beyond the upright unfolded position back toward the bottom panel 14. As illustrated the side and front panel members 24, 26 and 28 respectively extend above the plane of the bottom panel 14 when in the upright position. The opposing side panels 24 and 26 include flexible arm members 38 and 40 which extend beyond the front portion 18 of bottom panel 14. A front suspension means is provided for supporting the front portion of the tray 12. The front suspension means comprises a flexible strap or ribbon means 42 which passes through the strap receiving openings 44 and 46 disposed in the flexible arms 38 and 40 respectively. The strap 42 is provided with fastener means at the ends such as a two eye buckle means 50 for adjustably securing the strap 42 to a supporting structure such as, for example, the head rest 52 of the front seat 54 of a conventional automobile. The tray 12 also includes a rear suspension system for engaging a child's car seat 56, for example, secured to the back seat 57 of the automobile. It is to be understood that the child's car seat is secured to the rear seat 57 by the standard automobile seat belts (not shown). In the embodiment illustrated, the rear suspension system comprises a second or rear strap means 58, strap receiving openings 60a and 60b disposed centrally between side panels 24 and 26 in the bottom panel 14 of tray 12, a strap retaining means 62, and a buckle means 63 having a pair of rearward spaced belt receiving openings 64a and 64b for engaging the child's car seat belt means 66 and a pair of forward spaced strap receiving openings 68a and 68b for engaging the rear strap means 58 of the tray 12. As best seen in FIGS. 2 and 4, the rearward strap openings 64a and 64b of buckle 63 are of rectangular form with the width slightly exceeding the width of the respective belts 66 they receive. The forward openings 68a and 68b of buckle 63 and the openings 70a and 70b of the strap retaining means 62 are generally rectangular openings to receive and conform to the configuration of the rear strap means 58 which is similar to the configuration of the forward strap means 42. The strap means 58 also includes a buckle securing means 72. It is to be understood that the strap means 42 and 58 can be secured by tying the ends.

The strap retaining means 62, illustrated as a disk member, contacts the underside of bottom panel 14 adjacent the openings 60a and 60b when the ends of the strap 58 are passed through the openings 70a and 70b of the disk member 62, then drawn up through the openings 60a and 60b and then through openings 68a and 68b of buckle means 63 and secured together by fastener means such as buckle 72 to thereby provide the rear suspension system for the tray 12. The disk member 62 serves to distribute the forces created by the suspension strap 58 over a greater area of the bottom panel 14. This feature is particularly suitable when the tray is formed of composite paper and plastic materials which are more susceptible to stress than solid plastic or wood materials. Additionally when the disk member 62 is employed, the openings 60a and 60b may be formed as a single opening as described hereinafter.

Figure 6:
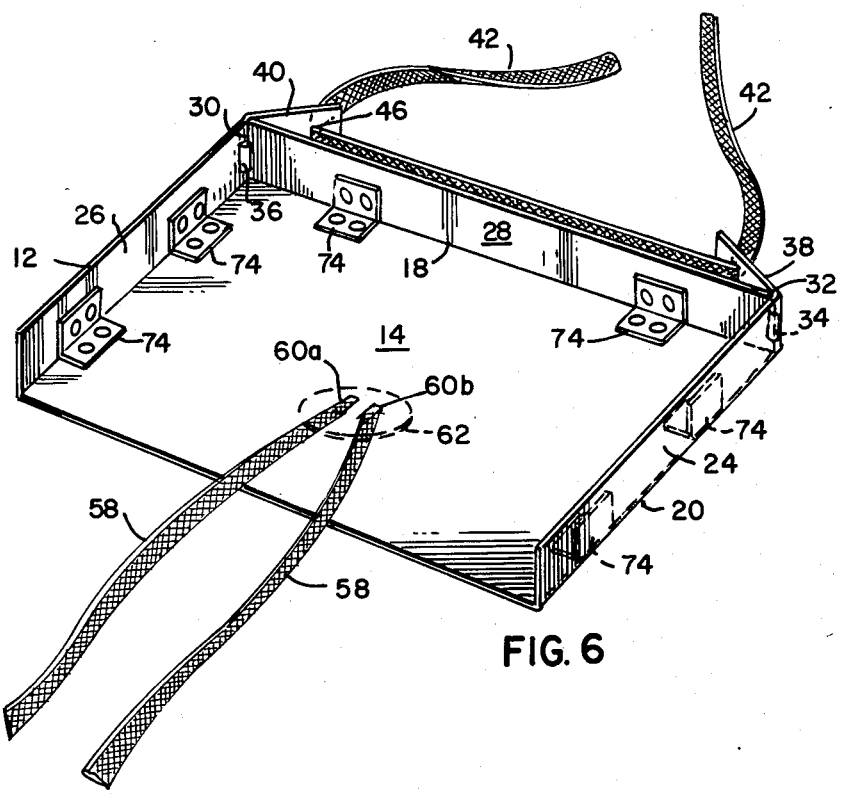
FIG. 6 is a perspective view of an alternate embodiment of the travel tray of FIG. 1.

The travel tray 12 of the present invention can be formed of various suitable materials such as cardboard or other corrugated or composite plastic and paper products which have sufficient strength to support various objects of relatively light weight such as toys, games and eating materials. One suitable material is a composite of polyurethane foam sandwiched between Kraft and sold under the name COROGUARD. Other suitable materials are plastic, wood, metal and combinations thereof. Referring now more particularly to FIG. 6, when materials such as wood, metal and heavy plastics are employed, the side panels 24 and 26 and front panel 28 can be secured to the bottom panel 14 by hinge means 74 which permit the side and front panels to fold and unfold relative to the bottom panel. Other hinge means such as piano hinges as are well known can be employed. When paper products are employed as the tray material, the side and front panels can be folded and unfolded without the need of separate hinge means as best illustrated by FIG. 1. The strap retaining means 62 and buckle means 63 can also be formed of suitable plastic, paper, wood and metal materials or combinations thereof. The suspension straps 42 and 58 may be formed of cloth, plastic, leather or any other appropriate flexible and durable substance. Additionally, the suspension straps 42 and 58 may be generally flat or round in configuration with the strap receiving openings being generally rectangular or round to conform to the strap configuration. Additionally, while the fastener means for the straps has been disclosed a buckle means 50 and 72, other fasteners such as snaps or mating material called by the name "velcro" are suitable. Also the straps can be secured by tying the ends as shown by a releasable bow knot 76 in FIG. 3 and as described hereinbefore.

Figure 7:
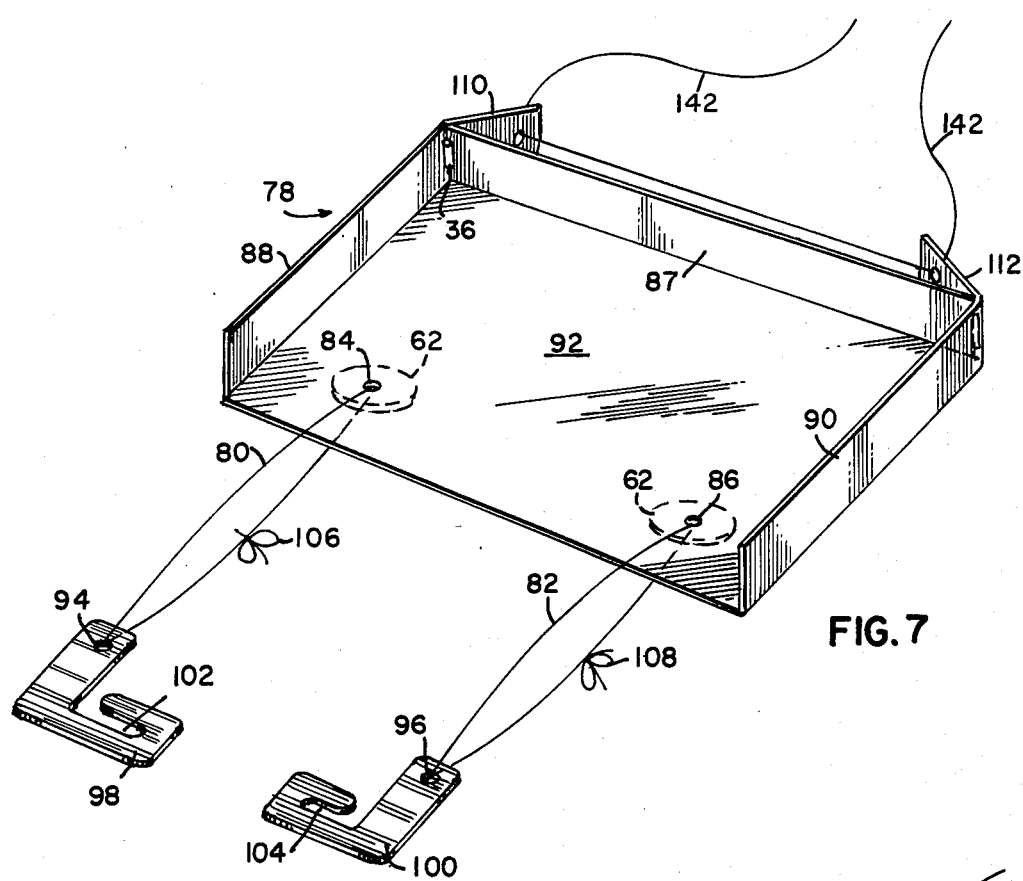
FIGS. 7 and 8 are perspective views of alternate embodiments of the travel tray assembly of the present invention.
Figure 8:
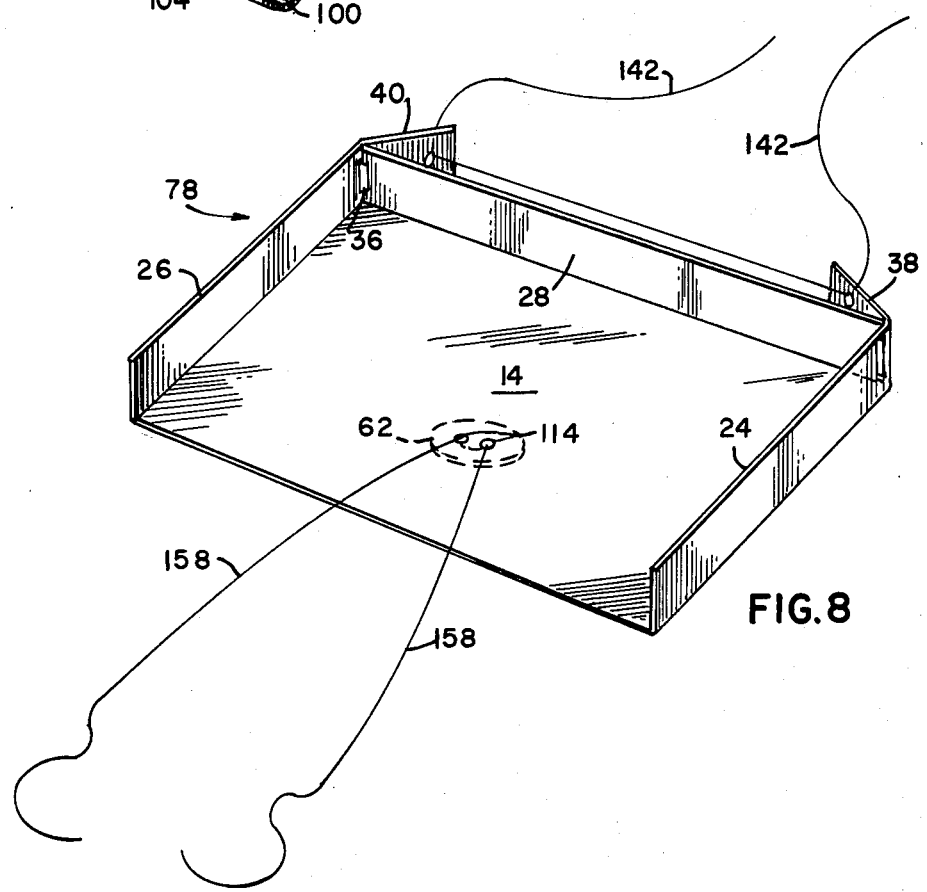

Referring now to FIGS. 7 and 8, there are illustrated alternate embodiments of the travel tray assembly in accordance with the present invention. As illustrated in FIG. 7, the tray 78 is essentially the same as tray 12 of FIG. 1 except that the front suspension system includes a cord 142 and the rear suspension system comprises a pair of suspension cords 80 and 82 which are each connected to the cord retaining means 62 shown by dotted lines through cord receiving openings 84 and 86 which are positioned adjacent the side panels 88 and 90 of bottom panel 92. Attached to cords 80 and 82 through cord receiving openings 94 and 96 are hook members 98 and 100. The hook members 98 and 100 are provided with openings 102 and 104 for attachment to the child's car seat belts as described hereinbefore or to other suitable structures of the child's car seat or automobile to provide rear suspension of the tray. Adjustment of cords 80 and 82 is provided by bow knots 106 and 108.

Additionally, it is to be understood that the flange members 34 and 36 (illustrated in the various views of the drawings) may be omitted whereby the front panel member 87 (still referring to FIG. 7) is held in the upright position by the coaction of side panels 84 and 86, arm members 110 and 112 and cord 142 when in the unfolded position. In FIG. 8 the travel tray assembly is essentially the same as the tray assembly of FIG. 7 except the rear suspension means comprises only the cord 158 which is attached to cord retaining means 62 through openings 114 in the center of the rear portion of bottom panel 14 in the same manner as the tray 12 of FIG. 1.

In using the travel tray of the present invention as constructed in accordance with FIG. 1, for example, and wherein the tray is formed of COROGUARD material, for example, the tray assembly is unfolded to the position for use as shown in FIG. 1 with the front panel 28 and side panels 24 and 26 in upstanding position. With reference to FIGS. 3 and 4, the back suspension system is attached via buckle means 63 to the child's car seat belts 66 and the length of strap 58 adjusted so that the back portion 16 of the bottom panel 14 contacts the child's car seat 56 so as to be supported thereby and then secured in position by fastening the strap 58. The strap 42 is then attached to the head rest 52 of the front seat 54 and the length adjusted so that the tray is suspended in level position in front of the user, child, 77. As can be appreciated, the strap of the front suspension system holds the side panels 24 and 26 in upright position by urging the arms 38 and 40 toward each other. It can also be appreciated that the side panels 24 and 26, flanges 34 and 36 and arms 38 and 40 all cooperate to support the front panel 28 in the upright position without the need of fasteners. As can also be appreciated, the travel tray assembly can be quickly and easily partially or completely detached. For example, partial detachment can be accomplished to permit removal of the car seat 56 and occupant by simply removing the car seat belts from the buckle receiving openings 64 whereby the child and car seat can be removed free of the travel tray assembly. For complete detachment, the front suspension strap is unfastened from the head rest.

When the travel tray is formed of a material such as corrugated paper, foam plastics, COROGUARD, and the like which are collapsible under forces or pressures as might occur in an automobile accident, there is provided a safety feature in that the risk of injury is reduced. Where the child's car seat does not provide support for the rear portion of the tray then the rear portion of the tray can be suitably supported on the lap of the user. Also the embodiment of FIG. 7 can be employed wherein a pair of rear suspension cords can be employed to provide lateral support for the rear portion of the tray. It is also appreciated that the rear portion of a travel tray can be provided with both central and lateral strap receiving openings to provide versatility in use.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in a limiting sense.

I claim:

1. A portable tray assembly adapted for removable mounting in an automobile between the front seat and a child's car seat having a pair of seat belt members and supported on the back seat of said automobile, said tray assembly comprising:
    a tray member comprising a substantially rigid bottom panel member having front, back, and side portions;
    a pair of opposing folding end panels extending along said side portions of said bottom panel and extending above the plane of said bottom panel when in the unfolded position;
    a third folding end panel extending between said opposing end panel and along the front portion of said bottom panel and above the plane of said bottom panel when in the unfolded position;
    said opposing end panels having arm members extending beyond the front portion of said bottom panel;
    a front suspension means connected to each of said arm members for attaching the front portion of said bottom panel to the front seat of the automobile; and
    a back suspension means connected to the back portion of said bottom panel member for attaching said back portion of said bottom panel member to the child's car seat belt members comprising a buckle means having a pair of spaced seat belt receiving openings for attachment to said seat belt members of said child's car seat, a strap receiving opening and an adjustable flexible strap means connecting said buckle means to said back portion of said bottom panel;
    said front and back suspension means coacting to hold said tray in a level position.

2. The portable tray assembly of claim 1 wherein said back suspension means comprises a pair of buckle means, each having a seat belt receiving opening for attachment to one of said seat belt members of said child's car seat, a flexible member receiving opening and a pair of elongated adjustable flexible members connecting said buckle means to said back portion of said bottom panel member.

3. The portable tray assembly of claim 1 wherein the front suspension means comprises an adjustable flexible strap member.

4. The portable tray assembly of claim 1 wherein said pair of opposing end panels and said third panel are hingedly mounted on said bottom panel.

5. A portable tray assembly comprising a rigid bottom panel member having front, back, and side portions;
    a pair of opposing folding end panel members extending along said side portions of said bottom panel and extending above the plane of said bottom panel when in the unflooded position;
    a third folding end panel member extending between said opposing end panel members and along the front portion of said bottom panel member and above the plane of said bottom panel member when in the unfolded position;
    said opposing end panel members having flexible arm members extending beyond the front portion of said bottom panel member;
    front suspension means;
    said front suspension means adapted to be secured to each of said flexible arm members and to be drawn taught so as to urge said flexible arm members and associated opposing end panel members toward each other when in the unfolded position;

whereby said opposing end panel members contact said third folding end panel member to thereby support said third folding end panel member in the unfolded position; and back suspension means associated with the back portion of said bottom panel member;

said front and back suspension means coacting to hold said tray in level position.

6. A portable tray assembly adapted for removable mounting between two supporting structures comprising:

a bottom panel member having front, back, and side portions;

a pair of opposing folding end panel members extending along said side portions of said bottom panel member and extending above the plane of said bottom panel member when in the unfolded position;

a third folding end panel member extending between said opposing end panel member and along the front portion of said bottom panel member and above the plane of said bottom panel member;

said opposing end panel members having flexible arm members extending beyond the front portion of said bottom panel member;

front suspension means for removable attachment to one of said supporting structures;

said front suspension means adapted to be secured to each of said flexible arm members and to be drawn taught so as to urge said flexible arm members and associated opposing end panel members toward each other when in the unfolded position;

whereby said opposing end panel members contact said third folding end panel member to thereby support said third folding end panel member in the unfolded position; and back suspension means associated with the back portion of said bottom panel member for removable attachment to the other of said supporting structures;

said front and back suspension means coacting to hold said tray in level position.

7. A portable tray assembly adapted for removable mounting in an automobile between the front seat and a child's car seat having a pair of seat belt members and supported on the back seat of said automobile, said tray assembly comprising:

a tray member comprising a substantially rigid bottom panel member having front, back, and side portions;

a pair of opposing folding end panel members extending along said side portions of said bottom panel member and extending above the plane of said bottom panel member when in the unfolded position;

a third folding end panel member extending between said opposing end panel members and along the front portion of said bottom panel member and above the plane of said bottom panel member when in the unfolded position;

said opposing end panel members having flexible arm members extending beyond the front portion of said bottom panel member;

a front suspension means connected to said flexible arm members for attaching said portable tray assembly to the front seat of the automobile;

said front suspension means adapted to be secured to each of said flexible arm members and to be drawn taught so as to urge said flexible arm members and associated opposing end panel members toward each other when in the unfolded position;

whereby said opposing end panel members contact said third folding end panel member to thereby support said third folding end panel member in the unfolded position; and a back suspension means connected to the back portion of said bottom panel member for attaching said back portion of the bottom panel member to the child's car seat;

said front and back suspension means coacting to hold said tray in a level position.

8. The portable tray assembly of claim 7 wherein the front suspension means comprises an adjustable flexible strap member.

9. The portable tray assembly of claim 7 wherein said back suspension means comprises a buckle means having a pair of spaced seat belt receiving openings for attachment to said seat belt members of said child's car seat, a strap receiving opening and an adjustable flexible strap means connecting said buckle means to said back portion of said bottom panel.

10. The portable tray assembly of claim 7 wherein said pair of opposing end panels and said third panel are hingedly mounted on said bottom panel.

11. The portable tray assembly of claim 7 wherein said back suspension means comprises a pair of elongated flexible members each having one end attached to the back portion of said bottom panel member.

12. The portable tray assembly of claim 11 further comprising hook members attached to the other end of said flexible members and means for adjusting the length of said elongated flexible members.

13. The portable tray assembly of claim 7 wherein said front and back suspension means include flexible cord means.

14. A portable tray assembly for use in an automobile between the front seat and a child's car seat supported on the back seat of said automobile, said tray assembly comprising:

a tray member comprising a rigid bottom panel member having front, back, and side portions;

a pair of opposing folding end panel members extending along said side portions of said bottom panel member and extending above the plane of said bottom panel member when in the unfolded position;

a third folding end panel member extending between said opposing end panel members and along the front portion of said bottom panel member and above the plane of said bottom panel member;

said opposing end panel members each having an arm member extending beyond the front portion of said bottom panel member;

front suspension means comprising a flexible cord member;

said front suspension means adapted to be secured to each of said flexible arm members and to be drawn taught so as to urge said flexible arm members and associated opposing end panel members toward each other when in the unfolded position;

whereby said opposing end panel members contact said third folding end panel member to thereby support said third folding end panel member in the unfolded position; and back suspension means comprising a pair of flexible cord members connected to the back portion of said bottom panel for releasably attaching the back portion of said tray to said child's car seat;
said front and back suspension means coacting to hold said tray in level position.

15. A portable tray assembly comprising:

a rigid bottom panel member having front, back, and side portions;

a pair of opposing folding end panel members extending along said side portions of said bottom panel member and extending above the plane of said bottom panel member when in the unfolded position;

a third folding end panel member extending between said opposing end panel members and along the front portion of said bottom panel member and above the plane of said bottom panel member when in the unfolded position;

said opposing end panel members having flexible arm members extending beyond the front portion of said bottom panel member;

front suspension means including an adjstable flexible strap means;

said front suspension means adated to be secured to each of said flexible arm members and to be drawn taught so as to urge said flexible arm members and associated opposing end panel members toward each other when in the unfolded position;

whereby said opposing end panel members contact said third folding end panel member to thereby support said third folding end panel member in the unfolded position; and back suspension means associated with the back portion of said bottom panel member, said back suspension means comprising a buckle means having a pair of spaced seat belt receiving openings, a strap receiving opening and an adjustable flexible strap means associated with said strap receiving opening for connecting said buckle means to said back portion of said bottom panel member;

said front and back suspension means coacting to hold said tray in level position.

* * * * *